(12) United States Patent
Meng et al.

(10) Patent No.: US 11,772,064 B2
(45) Date of Patent: Oct. 3, 2023

(54) REACTION APPARATUS

(71) Applicant: Jiahua Science & Technology Development (Shanghai) Ltd., Shanghai (CN)

(72) Inventors: Jing Meng, Shanghai (CN); Zhilong Wei, Shanghai (CN); Hui Wei, Shanghai (CN); Yubo Li, Shanghai (CN)

(73) Assignee: Jiahua Science & Technology Development (Shanghai) Ltd., Shanghai (CN)

( * ) Notice: Subject to any disclaimer, the term of this patent is extended or adjusted under 35 U.S.C. 154(b) by 126 days.

(21) Appl. No.: 17/617,149

(22) PCT Filed: Mar. 23, 2020

(86) PCT No.: PCT/CN2020/080713
§ 371 (c)(1),
(2) Date: Dec. 7, 2021

(87) PCT Pub. No.: WO2021/008160
PCT Pub. Date: Jan. 21, 2021

(65) Prior Publication Data
US 2022/0234022 A1    Jul. 28, 2022

(30) Foreign Application Priority Data

Jul. 12, 2019   (CN) .......................... 201921097479.X

(51) Int. Cl.
*B01J 19/18* (2006.01)
*B01J 4/00* (2006.01)

(52) U.S. Cl.
CPC ........... *B01J 19/1881* (2013.01); *B01J 4/001* (2013.01); *B01J 19/18* (2013.01); *B01J 2203/00* (2013.01);
(Continued)

(58) Field of Classification Search
CPC ........ B01J 19/1881; B01J 4/001; B01J 19/18; B01J 2203/00; B01J 2204/002;
(Continued)

(56) References Cited

U.S. PATENT DOCUMENTS 8,152,356 B2    4/2012   Guo
2011/0195462 A1   8/2011   Banks

FOREIGN PATENT DOCUMENTS

CN    101422717    5/2009
CN    103406045    11/2013
(Continued)

OTHER PUBLICATIONS

Machine translation of CN-107937012A (Year: 2023).*
(Continued)

*Primary Examiner* — Huy Tram Nguyen
(74) *Attorney, Agent, or Firm* — Brownstein Hyatt Farber Schreck, LLP

(57) ABSTRACT

A reaction apparatus, comprising: a reaction kettle; a circulation loop, comprising a circulation pipeline and a circulator pump provided on the circulation pipeline, a discharging end of the circulator pump being communicated with the top of the reaction kettle by means of a circulation valve and a charging end of the circulator pump being communicated with the bottom of the reaction kettle by means of a block valve; a feeding loop, comprising a feeding pipeline and a bypass pipeline, the feeding pipeline being provided between the block valve and the circulator pump and being communicated with the circulation pipeline, the bypass pipeline being provided with a control valve, and one end of the bypass pipeline being communicated with the discharging end of the circulator pump and the other end thereof being communicated with the bottom of the reaction kettle; and a discharging loop, comprising a discharging pipeline
(Continued)

provided between the circulator pump and the circulation valve and communicated with the circulation pipeline, the discharging pipeline being provided with a discharging valve.

16 Claims, 2 Drawing Sheets

(52) U.S. Cl.
CPC .... *B01J 2204/002* (2013.01); *B01J 2204/005* (2013.01)

(58) Field of Classification Search
CPC ........ B01J 2204/005; B01J 2208/00787; B01J 19/0066; B01J 4/008; B01F 25/51; B01F 27/90
USPC ....................................................... 422/225
See application file for complete search history.

(56) References Cited

FOREIGN PATENT DOCUMENTS

| CN | 103406045 A | * 11/2013 | |
|---|---|---|---|
| CN | 204768663 | 11/2015 | |
| CN | 205886847 U | 1/2017 | |
| CN | 107937012 A | * 4/2018 | ............. C10G 1/002 |
| CN | 207722785 | 8/2018 | |
| CN | 108704586 A | 10/2018 | |

OTHER PUBLICATIONS

Machine translation of CN-103406045 A (Year: 2023).*
International Search Report and Written Opinion dated Jun. 18, 2020, PCT/CN2020/080713, 13 pages.
Supplementary European Search Report dated May 10, 2022, European Application No. 20839736.4, 11 pages.
Database WPI Week 201715 Thomson Scientific, London, GB; AN 2017-07586S XP002806204, & CN 205 886 847 U (Zhejiang Shenghui Chem Co Ltd) Jan. 18, 2017 (Jan. 18, 2017).
Database WPI Week 201876 Thomson Scientific, London, GB; AN 2018-86177W XP002806205, & CN 108 704 586 A (Univ Zhejiang Technology ) Oct. 26, 2018 (Oct. 26, 2018).

* cited by examiner

REACTION APPARATUS

CROSS-REFERENCE TO RELATED APPLICATION

This application is a national phase application under 35 U.S.C. § 371 of PCT/CN2020/080713, filed on Mar. 23, 2020, which claims priority to Chinese Application No. 201921097479.X filed Jul. 12, 2019, the contents of which are incorporated herein by reference in their entirety.

TECHNICAL FIELD

The present application belongs to the technical field of chemical production equipment, and specifically relates to a reaction apparatus.

BACKGROUND

At present, the use of reaction devices is very common in the synthesis and preparation of chemical products.

Chinese patent application CN204768663U discloses a reaction kettle, which comprises a kettle body, a pipeline assembly, a circulating pump, a feeding hopper and a valve assembly. The two ends of the kettle body are respectively provided with an upper head and a lower head. Both the feeding end and the discharging end of the circulating pump are communicated with a flow delivery pipe. The feeding hopper is communicated with the flow delivery pipe, and the feeding hopper is used for feeding the reaction raw materials, and then the reaction raw materials can be transported from the feeding hopper to the kettle body through the flow delivery pipe, a branch pipe, a flow guide pipe and an overflow pipe. The feeding hopper can be installed on the floor of a plant or on an external bracket, and can also be adjusted and installed according to the practical situation.

The valve assembly comprises a discharging valve, a feeding valve and a circulation valve. The discharging valve is arranged on the flow delivery pipe, and the first end of the discharging valve is communicated with the lower head. The feeding valve is arranged in the flow delivery pipe, and the first end of the feeding valve is communicated with the feeding hopper, and the second end of the feeding valve is respectively communicated with the second end of the discharging valve and the feeding end of the circulator pump. The circulation valve is arranged in the flow delivery pipe, and the first end of the circulation valve is communicated with the discharge end of the circulator pump, and the second end of the circulation valve is communicated with the upper head.

When the reaction materials need to be fed into the kettle body, firstly, the discharge valve is closed, the feeding valve and the circulation valve are opened, and the circulation pump is controlled to work normally; then the reaction materials are fed into the feeding hopper, and then fed into the kettle body from the feeding hopper through the circulator pump. When feeding is completed, firstly, the feeding valve is closed, and the discharge valve is opened. The reaction raw materials can be conveyed from the bottom of the kettle body to the top of the kettle body through the circulator pump, thus achieving an effect of the mixing the raw materials during the process of circulating transportation, so that the process steps of circulating and feeding can be realized through a circulator pump and a plurality of control valves.

However, the above-mentioned reaction kettle still has the following defects: 1. the method of feeding at the top of the kettle requires a circulating pump to draw the materials from the bottom to the top of the kettle, and the energy consumption of pump total head generated in the process is large. 2. If the raw material is a solid-liquid mixture or a viscous liquid, a wall build-up on the flow guide pipe will occur during the feeding process, and the overflow pipe may be blocked.

SUMMARY

Therefore, the technical problem to be solved by the present application is to overcome the above-mentioned defects in the prior art, thereby providing a reaction apparatus.

For this purpose, the present application adopts the following technical solutions:

A reaction apparatus, comprising: a reaction kettle;
a circulation loop, comprising a circulation pipeline and a circulator pump provided on the circulation pipeline, a discharging end of the circulator pump being communicated with the top of the reaction kettle by means of a circulation valve, and a charging end of the circulator pump being communicated with the bottom of the reaction kettle by means of a block valve;
a feeding loop, comprising a feeding pipeline and a bypass pipeline, the feeding pipeline being provided between the block valve and the circulator pump and being communicated with the circulation pipeline, the bypass pipeline being provided with a control valve, and one end of the bypass pipeline being communicated with the discharging end of the circulator pump and the other end thereof being communicated with the bottom of the reaction kettle; and
a discharging loop, comprising a discharging pipeline provided between the circulator pump and the circulation valve and communicated with the circulation pipeline, the discharging pipeline being provided with a discharging valve.

Preferably, the discharging pipeline is located at a position higher than that of the bypass pipeline.

Preferably, a bi-directional flow valve is provided at the bottom of the reaction kettle.

Preferably, the feeding pipeline is communicated with a feedstock container.

Preferably, the discharging pipeline is communicated with a storage tank.

Preferably, a vacuum pump is provided on an upper part of the reaction kettle.

Preferably, a stirring paddle is provided inside the reaction kettle.

Preferably, a driving device for driving the stirring blade is provided on the top of the reaction kettle.

Feeding can be achieved by closing the block valve, the discharging valve and the circulation valve, opening the feeding valve and the bi-directional flow valve, and then adjusting the control valve and the circulation pump.

Circulation can be achieved by closing the discharging valve, the feeding valve and the control valve, and opening the bi-directional flow valve, the circulation valve, the block valve and circulation pump.

Discharging can be achieved by closing the circulation valve, the feeding valve and the control valve, and opening the bi-directional flow valve, the discharging valve, the block valve and the circulation pump.

Compared with the prior art, the present application has the following advantages:

1. The reaction apparatus provided by the present application realizes the feeding at the bottom of the kettle by providing a bypass pipeline, a feeding pipeline and corresponding control valve and feeding valve, which not only overcomes the energy consumption of pump total head generated during the process of feeding materials from the bottom to the top of the kettle through a circulation pump, but also avoids the phenomena that wall build-up on the flow guide pipe and blocking of the overflow pipe occurred when the raw material is a solid-liquid mixture or a viscous liquid. By providing a bypass pipeline, a feeding pipeline, discharging pipeline and the corresponding valves, the present application can realize process steps of feeding, circulation and discharging by only switching the valve switch of a same circulating pump. The operation is simple and convenient, which greatly improves the production efficiency, promotes the operational requirements of production standardization, and makes production more standardized and efficient.

DESCRIPTION OF THE DRAWINGS

In order to more clearly illustrate the technical solutions of the embodiments of the present application or the prior art, a brief introduction will be given below on the accompanying drawings required to be used in the specific embodiments. Apparently, the accompanying drawings described below are some embodiments of the present application. For those skilled in the art, other accompanying drawings can be obtained based on these accompanying drawings without any creative effort.

REFERENCE NUMBERS

1—reaction kettle; 2—circulation pipeline; 3—circulation valve; 4—circulator pump; 5—bypass pipeline; 6—control valve; 7—feeding pipeline; 8—feeding valve; 9—block valve; 10—discharging pipeline; 11—discharging valve; 12—bi-directional flow valve; 13—feedstock container; 14—storage tank; 15—vacuum pump; 16—driving device; and 17—stirring paddle.

DETAILED DESCRIPTION OF THE EMBODIMENTS

The technical solutions of the present application will be described more clearly and fully hereinafter with reference to the accompanying drawings. The described embodiments are part of the embodiments of the application and not all embodiments. Based on the embodiments of the present application, all other embodiments obtained by one of ordinary skill in the art without creative work are within the scope of protection of the present application.

In the description of the application, unless otherwise specified, it should be understood that the terms "communicated", "connected" are to be construed broadly, for example, may be a fixed connection, a detachable connection or an integrated connection; may be mechanical connection or electrical connection; may be direct connection, may also be indirect connection by an intermediate medium, or may be in communication with the interior of two elements. The specific meanings of the above-mentioned terms in the present application can be understood by one of ordinary skill in the art.

In addition, the technical features involved in the various embodiments of the application described below can be combined with each other as long as there is no conflict between each other.

Embodiment 1

Figure 1:
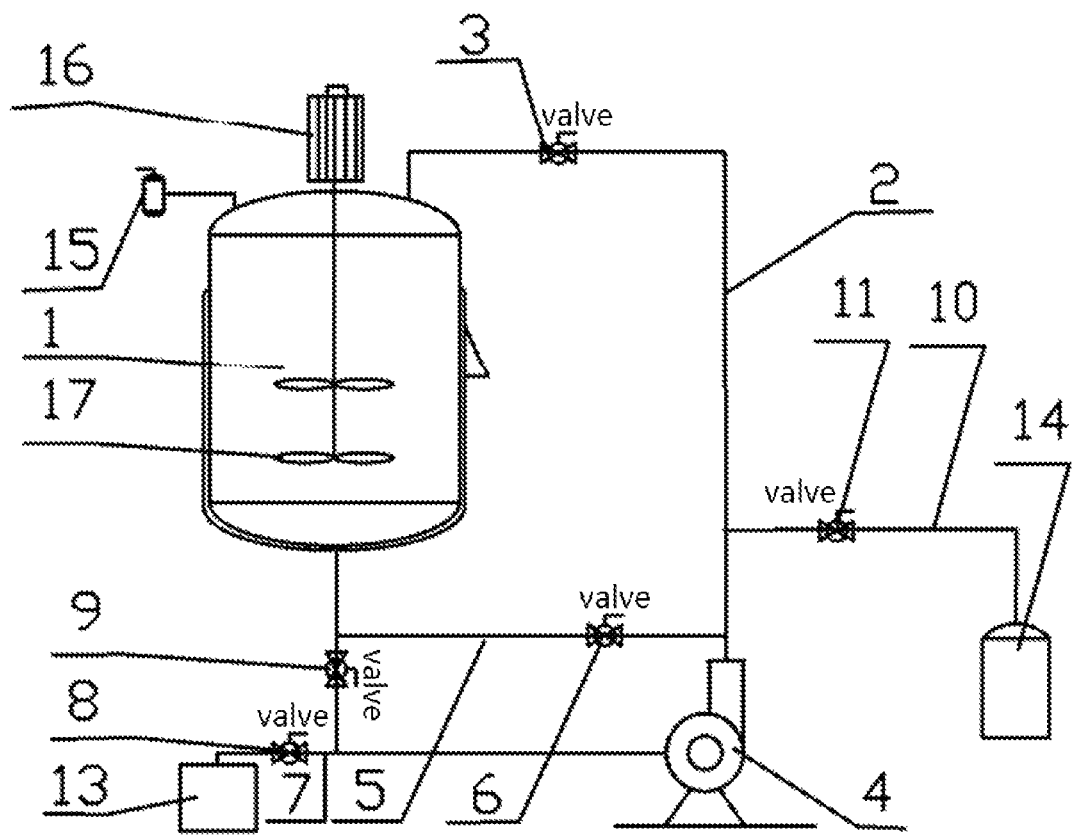
FIG. 1 is a schematic structural diagram of a reaction apparatus provided in the first embodiment of the present application.

As shown in FIG. 1, an embodiment of a reaction apparatus comprises: a reaction kettle 1;
a circulation loop, comprising a circulation pipeline 2 and a circulator pump 4 provided on the circulation pipeline 2, a discharging end of the circulator pump 4 being communicated with the top of the reaction kettle 1 by means of a circulation valve 3, and a charging end of the circulator pump 4 being communicated with the bottom of the reaction kettle 1 by means of a block valve 9;
a feeding loop, comprising a feeding pipeline 7 and a bypass pipeline 5, the feeding pipeline 7 being provided between the block valve 9 and the circulator pump 4 and being communicated with the circulation pipeline 2, the bypass pipeline 5 being provided with a control valve 6, and one end of the bypass pipeline 5 being communicated with the discharging end of the circulator pump 4 and the other end thereof being communicated with the bottom of the reaction kettle 1; and
a discharging loop, comprising a discharging pipeline 10 provided between the circulator pump 4 and the circulation valve 3 and communicated with the circulation pipeline 2, the discharging pipeline 10 being provided with a discharging valve 11.

The discharging pipeline 10 is located at a position higher than that of the bypass pipeline 5.

The feeding pipeline 7 is communicated with a feedstock container 13.

The discharging pipeline 10 is communicated with a storage tank 14.

A vacuum pump 15 is provided on an upper part of the reaction kettle 1.

A stirring paddle 17 is provided inside the reaction kettle 1. A driving device 16 for driving the stirring blade 17 is provided on the top of the reaction kettle 1.

In the above-mentioned reaction kettle 1, feeding at the bottom of the kettle is achieved by providing a bypass pipeline 5, a feeding pipeline 7 and corresponding control valve 6 and feeding valve 8. Compared with the prior art, it overcomes the pump total head generated during the process of feeding materials from the bottom to the top of the kettle through a circulation pump 4, thus reducing the energy consumption. By using the above-mentioned reactor 1, feeding can be achieved by closing the block valve 9, the discharging valve 11 and the circulation valve 3, opening the feeding valve 8, and then adjusting the control valve 6 and the circulation pump 4. Circulation can be achieved by closing the discharging valve 11, the feeding valve 8 and the control valve 6, and opening the circulation valve 3, the block valve 9 and the circulation pump 4. Discharging can be achieved by closing the circulation valve 3, the feeding valve 8 and the control valve 6, and opening the discharging valve 11, the block valve 9 and the circulation pump 4. That is, the process steps of feeding, circulation and discharging can be realized by only switching the valve switch of a same circulating pump, so the operation is simple.

Figure 2:
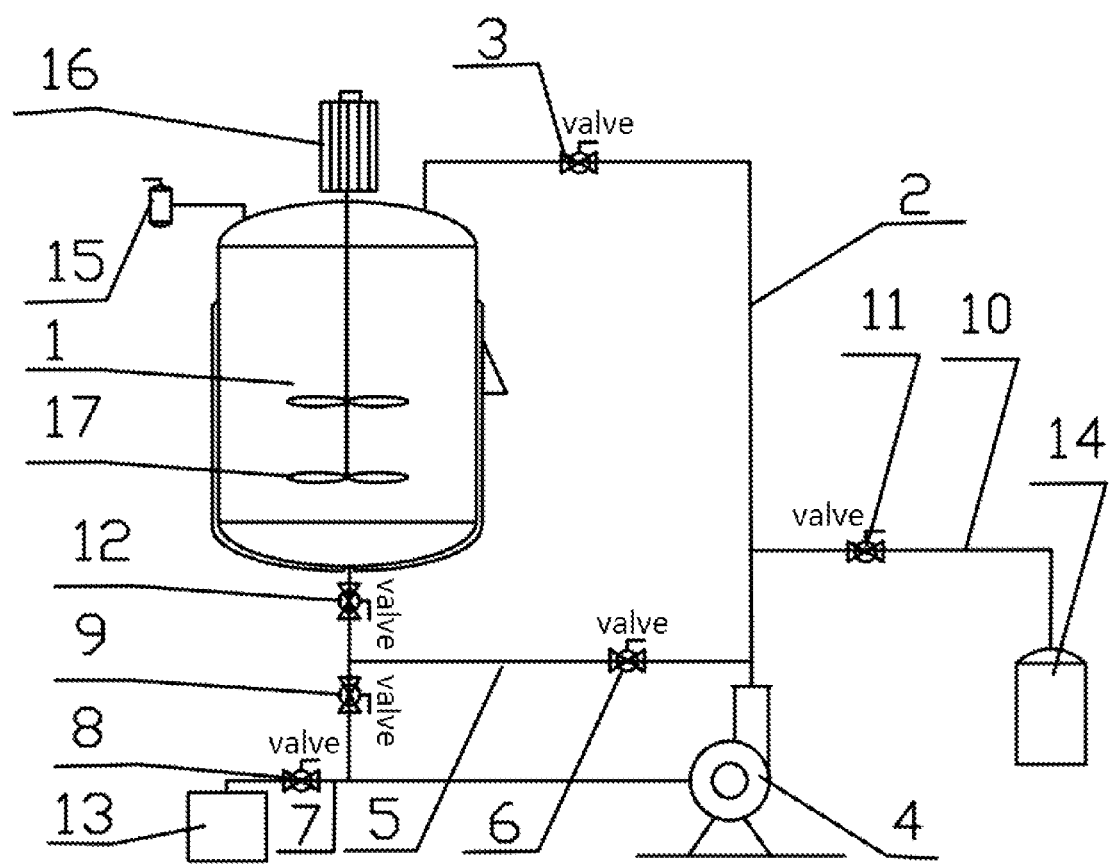
FIG. 2 is a schematic structural diagram of an improved reaction apparatus provided in the first embodiment of the present application.

As an improved embodiment, as shown in FIG. 2, a bi-directional flow valve 12 is provided on the circulation pipeline 2 between the bottom of the reaction kettle 1 and the bypass pipeline 5. When feeding, the materials can flow into the kettle from the bottom of the kettle; when circulating and discharging, the materials can flow out of the kettle from inside of the kettle, so that the flow direction of the materials is not limited.

The feeding pipeline 7 is communicated with a feedstock container 13, and feedstock container 13 is selected from the group consisting of a storage tank, an IBC tank, or an iron tank, which is fixed or unfixed. When feeding materials, the labor cost can be saved and the production efficiency can be improved.

The discharging pipeline 10 is communicated with a storage tank 14, and storage tank 14 is selected from the group consisting of a storage tank, an IBC tank, or an iron tank, which is fixed or unfixed. The product can be quickly poured into a next reaction kettle or a container that can contain the product through the circulating pump, thereby improving the production efficiency.

A vacuum pump 15 is provided on an upper part of the reaction kettle 1. When air in the reaction needs to be replaced, the vacuum pump 15 can be started to replace air in the reactor 1.

A stirring paddle 17 is provided inside the reaction kettle 1, and a driving device 16 for driving the stirring blade 17 is provided on the top of the reaction kettle 1. After feeding is completed, the driving device 16 is started, and the stirring paddle 17 starts to stir the materials in the reaction kettle 1, so that the materials are fully mixed.

Apparently, the aforementioned embodiments are merely examples illustrated for clearly describing the present application, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present application.

The invention claimed is:

1. A reaction apparatus, comprising:
   a reaction kettle;
   a circulation loop, comprising a circulation pipeline and a circulator pump provided on the circulation pipeline, a discharging end of the circulator pump being communicated with the top of the reaction kettle by means of a circulation valve, and a charging end of the circulator pump being communicated with the bottom of the reaction kettle by means of a block valve;
   a feeding loop, comprising a feeding pipeline and a bypass pipeline, the feeding pipeline being provided between the block valve and the circulator pump and being communicated with the circulation pipeline, the bypass pipeline being provided with a control valve, and one end of the bypass pipeline being communicated with the discharging end of the circulator pump and the other end thereof being communicated with the bottom of the reaction kettle; and
   a discharging loop, comprising a discharging pipeline provided between the circulator pump and the circulation valve and communicated with the circulation pipeline, the discharging pipeline being provided with a discharging valve.

2. The reaction apparatus of claim 1, wherein the discharging pipeline is located at a position higher than that of the bypass pipeline.

3. The reaction apparatus of claim 1, wherein a bi-directional flow valve is provided at the bottom of the reaction kettle.

4. The reaction apparatus of claim 1, wherein the feeding pipeline is communicated with a feedstock container.

5. The reaction apparatus of claim 1, wherein the discharging pipeline is communicated with a storage tank.

6. The reaction apparatus of claim 1, wherein a vacuum pump is provided on an upper part of the reaction kettle.

7. The reaction apparatus of claim 1, wherein a stirring paddle is provided inside the reaction kettle.

8. The reaction apparatus of claim 7, wherein a driving device for driving the stirring blade is provided on the top of the reaction kettle.

9. The reaction apparatus of claim 2, wherein a vacuum pump is provided on an upper part of the reaction kettle.

10. The reaction apparatus of claim 3, wherein a vacuum pump is provided on an upper part of the reaction kettle.

11. The reaction apparatus of claim 4, wherein a vacuum pump is provided on an upper part of the reaction kettle.

12. The reaction apparatus of claim 5, wherein a vacuum pump is provided on an upper part of the reaction kettle.

13. The reaction apparatus of claim 2, wherein a stirring paddle is provided inside the reaction kettle.

14. The reaction apparatus of claim 3, wherein a stirring paddle is provided inside the reaction kettle.

15. The reaction apparatus of claim 4, wherein a stirring paddle is provided inside the reaction kettle.

16. The reaction apparatus of claim 5, wherein a stirring paddle is provided inside the reaction kettle.

* * * * *